United States Patent [19]

Dunn

[11] Patent Number: 5,115,355
[45] Date of Patent: May 19, 1992

[54] COMPACT COUDE OPTICS SYSTEM

[75] Inventor: Murray Dunn, Carlsbad, Calif.

[73] Assignee: Thermo Electron Technologies Corp., San Diego, Calif.

[21] Appl. No.: 618,645

[22] Filed: Nov. 27, 1990

[51] Int. Cl.⁵ .............................................. G02B 7/18
[52] U.S. Cl. .................... 359/876; 359/196; 359/220; 359/850; 359/223
[58] Field of Search ............... 359/196, 201, 202, 872, 359/876, 850, 220, 857; 250/234, 235, 236

[56] References Cited

U.S. PATENT DOCUMENTS

| 4,256,364 | 3/1981 | Minoura et al. ..................... 359/876 |
| 4,300,160 | 11/1981 | Pusch et al. ......................... 359/876 |
| 4,678,289 | 7/1987 | Mattelin et al. ..................... 359/876 |
| 4,883,348 | 11/1989 | Spivey et al. ........................ 359/857 |

OTHER PUBLICATIONS

SPIE, vol. 887, Acquisition Tracking and Pointing (1988).

*Primary Examiner*—Loha Ben
*Attorney, Agent, or Firm*—John R. Ross

[57] ABSTRACT

A compact coude optics system comprising a two axis gimbal system. Two mirrors rotate on one gimbal axis and the other two mirrors pivot on the other gimbal axis. The axes of the two gimbals intersect and light beams passing through the system effectively are turned at this point of intersection at a desired angle.

1 Claim, 2 Drawing Sheets

COMPACT COUDE OPTICS SYSTEM

This invention relates to optical beam directors and in particular to coude optics systems.

BACKGROUND OF THE INVENTION

Coude optics systems are common. These devices are used primarily in telescopic systems where the detector is in a fixed location relative to a movable telescope or as laser beam directors. Prior art coude optics systems are described in an article by W.L. Casey and D. D. Phinney published in Society of Photo Optical Instrumentation Engineering, Vol. 887 Acquisition, Tracking and Pointing. That article describes 32 coude optics systems. In none of these systems does the beam pass through one single point of rotation. This invention was disclosed by the applicant and his co-inventors but not claimed in U.S. Pat. No. 4,883,348 issued Nov. 28, 1989.

SUMMARY OF THE INVENTION

The present invention provides a compact coude optics system comprising a two axis gimbal system. Two mirrors rotate on one gimbal axis and the other two mirrors pivot on the other gimbal axis. The axes of the two gimbals intersect and light beams passing through the system effectively are turned at this point of intersection at a desired angle.

DETAILED DESCRIPTION OF PREFERRED EMBODIMENTS

Figure 1:
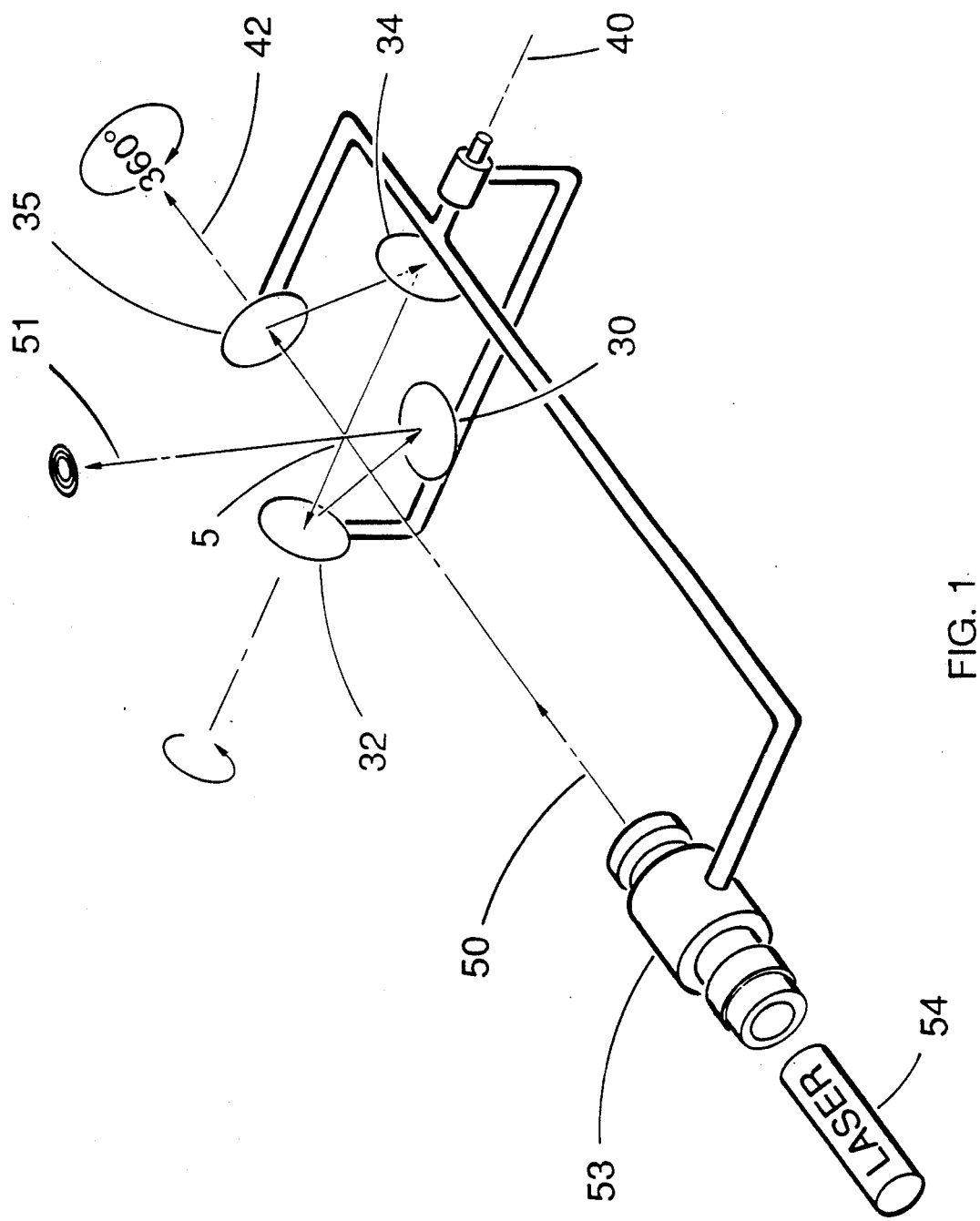
FIG. 1 is a sketch showing the principal features of the present invention.

The present invention provide a very compact coude optics system in which the beam being viewed or directed always passes through one single point of rotation shown as 4 in FIG. 1. The system consists of four mirrors 30, 32, 34 and 35. Mirror 30 and 32 are fixed with respect to each other and these two mirrors rotate about axis 40 which is in line with the centers of mirrors 32 and 34. Mirror 34 and 35 are fixed with respect to each other and supported on a frame attached to hollow bearing 53. These two mirrors rotate about an axis 42 which is in line with the center of mirror 35 and laser 54. The faces of mirrors 30 and 32 make an angle of 45 degrees relative to each other and the faces of mirrors 35 and 34 make an angle of 45 degrees relative to each other.

Narrow light beam 50 from laser 54 reflecting off mirror 35 to mirror 34 to mirror 32 to mirror 30 passes to a target as outgoing beam 51. Both the incoming beam 50 and outgoing beam 51 always pass through center of rotation 5 of the coude optics system no matter in which direction the system is pointing beam 51. This center of rotations is the intersection of axis 40 and axis 42.

Coude optics system described in FIG. 1 can be pointed in any direction except within a few degrees of the direction of axis. 42.

Figure 2A:
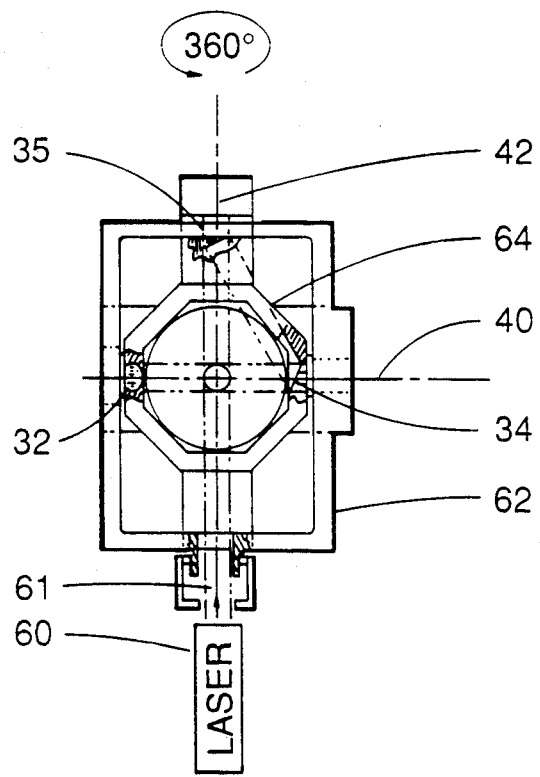
FIGS. 2A, 2B and 2C are drawings of a preferred embodiment of the present invention.
Figures 2B, 2C:
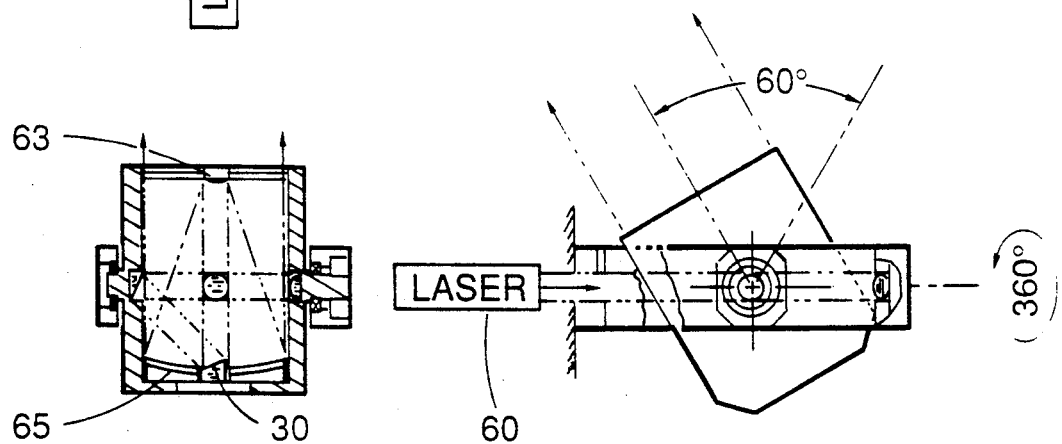

FIGS. 2A, B, and C show a specific embodiment of the present invention used in a beam expander/director to expand and direct a laser beam from a fixed laser 60 to any target located within plus or minus 30 degrees of the horizontal plane. Laser beam 61 from laser 60 reflects off a mirror 35 to mirror 34 to mirror 32 to mirror 30 to convex mirror 64 to spherical primary mirror 65 to target not shown. Mirrors 35 and 34 are attached to outer gimbal 62 which rotates 360° about axis 42. Mirrors 32 and 30 are attached to inner gimbal 64 which pivots plus and minus 30 degrees about axis 40.

When used as a telescope the laser shown in the figures would be replaced with a detector. While the above description contains many specificities, the reader should not construe these as limitations on the scope of this invention, but merely as exemplifications of preferred embodiments thereof. Those skilled in the art will envision many other possible variations which are within its scope.

Accordingly, the reader is requested to determine the scope of the invention by the appended claims and their legal equivalents, and not by the examples which have been given.

I claim:

1. A coude optics system comprising:
   a two axis gimbal system defining a first axis and a second axis, said first axis intersecting said second axis at a point defining a coude center of rotation,
   a first mirror,
   a second mirror,
   a third mirror and
   a fourth mirror;
   said first and second mirrors being fixed with respect to each other and arranged to rotate about said first axis, said third and fourth mirrors being fixed with respect to each other and arranged to rotate about said second axis;
   said mirrors being positioned so a to permit a light beam entering said system along said first axis to be reflected off each mirror in turn and directed to various targets within a wide field of regard by appropriate movement of the two gimbals.

* * * * *